Figures 1, 2:
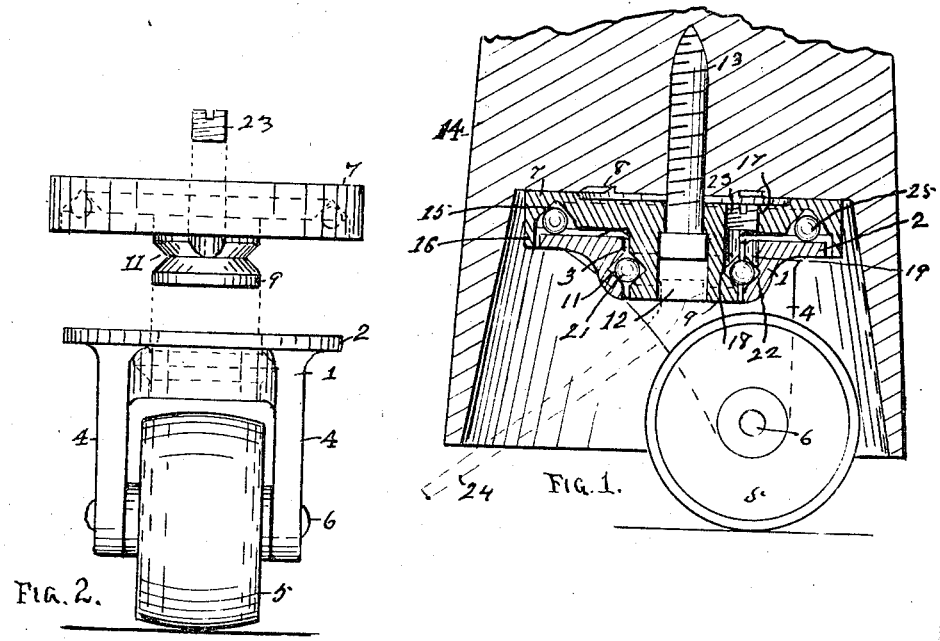

F. JANZEN.
CASTER.
APPLICATION FILED JULY 28, 1916.

1,203,879.

Patented Nov. 7, 1916.

Witnesses,
Roy E. Cahall,
P. A. Carr.

Franz Janzen, Inventor,
By Robert S. Carr, Attorney.

UNITED STATES PATENT OFFICE.

FRANZ JANZEN, OF HAMILTON, OHIO, ASSIGNOR OF ONE-THIRD TO EDWARD T. MALLOY AND ONE-THIRD TO GEORGE J. KALBERER, BOTH OF HAMILTON, OHIO.

CASTER.

1,203,879.  Specification of Letters Patent.  Patented Nov. 7, 1916.

Application filed July 28, 1916. Serial No. 111,818.

*To all whom it may concern:*

Be it known that I, FRANZ JANZEN, a citizen of the United States, residing at Hamilton, Butler county, Ohio, have invented a new and useful Improvement in Casters, of which the following is a specification.

My invention relates to casters of the class adapted to the use of articles of furniture or for other suitable purposes and the objects of my improvements are to provide separate ball bearings for supporting the weight on the caster and also for resisting the lateral thrust on the stem and securing the housing thereon; to provide means whereby a single lag screw may be used for securing the caster to an article of furniture and especially within the cup of a piano leg, and to provide simple, cheap and durable construction and assemblage of the different members for reducing the friction and securing facility of operation and efficiency of action. These objects may be attained in the following described manner as illustrated in the accompanying drawings, in which:—

Figure 1, is a vertical diametrical section of a caster embodying my improvements; and Fig. 2 a rear elevation showing the housing and the stem in position to be assembled.

In the drawings, 1 represents the housing formed with the circular plate 2 having a plane top surface and with the axial opening 3 and depending legs 4 whereby it may be supported on the floor wheel 5 by means of the axle 6. The top plate 7 is formed with a plurality of teeth 8 near the edge of its top surface and with the axial stem 9 adapted to depend within the opening 3 in the housing. Said stem is formed with an annular channel 11 and with the axial opening 12 the lower portion of which is enlarged and formed angular in cross section. A lag screw 13 may be inserted through said opening with its head within the angular portion thereof for securing the top plate to an article of furniture 14 as shown in Fig. 1. Said top plate 7 is formed with a circular channel 15 in its lower surface concentric with the stem and with the circular flange 16 adapted to depend around the plate 2 for excluding the dirt from between them. The hole 17 formed through the top plate is continued in the form of a groove 18 in the side of the stem to join the channel 11 therein, and a similar groove 19 adapted to register with groove 18 is formed in the wall of the opening 3 for permitting the antifriction balls 21 inserted through the hole 17 to enter the channel 11 and the channel 22 in registration therewith formed in the wall of the opening 3. The plug 23 serves to close the hole 17 to prevent said balls from falling out when the caster is inverted with the grooves 18 and 19 in registration. The plug wrench 24 shown in dotted lines in Fig. 1 serves to turn the top plate with the lag screw into secure engagement with an article of furniture when the engagement of the teeth 8 therewith will prevent the plate from being turned in the reverse direction and becoming detached. The antifriction balls 35 within the channel 15, serve to support the plate 7 out of frictional contact with the plate 2 of the housing, and the balls 21 within the channels 11 and 22 serve to prevent frictional contact of the stem with the wall of opening 3 when subjected to lateral thrusts and also to prevent the displacement of the housing from said stem.

In operation the use of the ball bearing to receive the vertical thrust and the separate ball bearing to resist the lateral thrust makes the action exceedingly sensitive and especially suited to the purposes for which it is intended.

Having fully described my improvements what I claim as my invention and desire to secure by Letters Patent of the United States is:—

1. A caster comprising a housing formed with a vertical opening therethrough, a plate formed with a stem depending within the opening, said stem and plate being formed with an axial opening having its lower portion enlarged and angular in cross section, a screw movably secured in said axial opening for the purpose specified, a ball bearing for supporting the plate on the housing, and a ball bearing for resisting lateral thrusts on the stem and also for preventing its removal from the opening in the housing.

2. A caster comprising a housing formed with a circular plane top surface having an axial opening therethrough, the wall of said opening being formed with an annular channel and with a vertical groove extending therefrom, a top plate formed with a stem depending through said opening and with a concentric channel in its lower surface, antifriction balls movable within said channel for supporting the top plate above the housing, said stem being formed with an annular channel in registration with the channel in the opening in the housing and also with a vertical groove extending therefrom adapted to register with the former groove and terminating in a circular opening through the top plate, and antifriction balls admitted through said opening and grooves to the registering channels for preventing the removal of the stem and for resisting lateral thrusts thereon.

3. A caster comprising a housing formed with a circular vertical opening, a top plate formed with a stem depending within the opening, a ball bearing for supporting the plate on the housing, a ball bearing encircling the stem within the opening, said stem and plate being formed with an axial opening therethrough having an enlarged and angular lower portion and a lag screw movably secured in said axial opening for securing the caster to an article of furniture.

4. A caster comprising a housing formed with a circular plane top surface with an axial opening therethrough, a plate formed with a stem depending within said opening, a ball bearing for supporting the plate above said plane surface, and a ball bearing encircling the stem within the opening and arranged to prevent its removal therefrom.

FRANZ JANZEN.

Witnesses:
 Geo. J. Kalberer,
 R. S. Carr.